United States Patent

Ernst et al.

[11] Patent Number: 5,553,390
[45] Date of Patent: Sep. 10, 1996

[54] LENGTH MEASURING SYSTEM

[75] Inventors: Alfons Ernst, Traunreut; Günther Nelle, Bergen, both of Germany

[73] Assignee: Dr. Johannes Heidenhain GmbH, Traunreut, Germany

[21] Appl. No.: 339,982

[22] Filed: Nov. 14, 1994

[30] Foreign Application Priority Data

Dec. 8, 1993 [EP] European Pat. Off. .............. 93119731

[51] Int. Cl.$^6$ .................................................... G01B 11/04
[52] U.S. Cl. ................................................ 33/706
[58] Field of Search ..................... 33/1 PT, 706, 33/707, 708; 250/237 G; 356/373, 374, 375, 395, 396

[56] References Cited

U.S. PATENT DOCUMENTS

| | | |
|---|---|---|
| 4,110,828 | 8/1978 | Baumgartner et al. |
| 4,158,509 | 6/1979 | Rieder et al. |
| 4,229,646 | 10/1980 | Burkhardt et al. |
| 4,229,647 | 10/1980 | Burkhardt. |
| 4,306,220 | 12/1981 | Schwefel et al. |
| 4,385,836 | 5/1983 | Schmitt. |
| 4,519,140 | 5/1985 | Schmitt. |
| 4,616,131 | 10/1986 | Burkhardt. |
| 4,628,609 | 12/1986 | Rieder et al. ............. 33/707 |
| 4,645,925 | 2/1987 | Schmitt. |
| 4,654,527 | 3/1987 | Schmitt. |
| 4,688,019 | 8/1987 | Schmitt. |
| 4,701,615 | 10/1987 | Schmitt. |
| 4,965,503 | 10/1990 | Watanabe et al. |
| 4,983,900 | 1/1991 | Nashiki et al. |
| 4,999,623 | 3/1991 | Affa. |
| 5,010,655 | 4/1991 | Rieder et al. ............. 33/707 |
| 5,062,214 | 11/1991 | Gustafsson et al. ....... 33/706 |
| 5,115,573 | 5/1992 | Rieder et al. ............. 250/237 G |

FOREIGN PATENT DOCUMENTS

| | | |
|---|---|---|
| 1773460 | 9/1971 | Germany. |
| 2730715 | 2/1978 | Germany. |
| 3909767 | 10/1989 | Germany. |
| 3928592 | 3/1990 | Germany. |
| 293190 | 8/1991 | Germany ............. 33/706 |

*Primary Examiner*—William A. Cuchlinski, Jr.
*Assistant Examiner*—G. Bradley Bennett
*Attorney, Agent, or Firm*—Brinks Hofer Gilson & Lione

[57] ABSTRACT

A length measuring system having a scale with a first portion and a second portion separated by a gap, wherein the first and second portions each have incremental graduations. The system further includes a scanner unit for scanning the incremental graduations of the first and second portions, wherein the scanner unit has two groups of scanner elements spaced apart by a greater than the width of the gap. The system has at least one control track parallel to and next to the incremental graduations of the first and second portions. A further scanner element is provided to scan the at least one control track and produce an output signal, wherein the output signal is a function of the absolute position of the first and second portions and controls a switchover from one group of scanner elements to the other group of scanner elements. The absolute position of the first and second portions is derived from the control track over the entire measurement length of the scale and the measurement increment of the control track is greater than the measurement increment of the incremental graduations of the first and second portions.

16 Claims, 3 Drawing Sheets

LENGTH MEASURING SYSTEM

Applicants claim, under 35 U.S.C. § 119, the benefit of priority of the filing date of Dec. 8, 1993, of European application, Ser. No. 93 11973 1.3, filed on the aforementioned date, a copy of which is being filed herewith, and the entire contents of which are incorporated herein by reference.

FIELD OF THE INVENTION

The invention relates to a length measuring system having a scale comprising a plurality of portions, and a scanner unit for scanning a high-resolution incremental graduation of the portions, which has two groups of scanner elements spaced apart by a distance greater than the gap width between two portions of the scale; parallel to and next to the incremental graduation, there is at least one control track which is scanned by a further scanner element, and as a function of the output signal of this scanner element, a switch from one group of scanner elements to the other is made.

BACKGROUND OF THE INVENTION

Length measuring systems of this kind are already known from Published, Non-Examined German Patent Applications DE-OS 17 73 460 and DE-OS 27 30 715. In these length measuring systems, two scanners spaced apart in the measuring direction are provided for scanning the incremental graduation of the portions of the scale. In DE-OS 17 73 460, in addition to the incremental graduation, switch cams or switch slots are provided, which turn the scanners on in alternation. The location of the switch cams or switch slots is chosen such that before a point where two scale portions abut one another is reached, the scanner that was active until then was shut off, while at the same time the other scanner, already located on the adjacent portion of the scale, is turned on. Expensive adjustment operations at the scale abutment points can thus be dispensed with, since by the alternating activation of the two scanners, the portions of the scale at the abutting points are not scanned.

In DE-OS 27 30 715, which is a point of departure for the present invention, a control track is mounted on each portion of the scale, next to the incremental graduation. The control track for each scale portion is black, or in other words is not permeable to light, beginning at one end of each portion, and ends with a transparent window in a different end region.

These known length measuring systems have the disadvantage that over the entire measurement length, the measurement is done only incrementally; it is not possible to determine the absolute position.

To overcome this disadvantage, in the length measuring system of DE-OS 39 28 592, the switchover position is determined by an external detector located outside the length measuring system. This detector detects the absolute positions over the entire measuring region. However, this measuring system has the disadvantage of requiring not only the incremental length measuring system but also a further, absolute measuring system.

OBJECT AND SUMMARY OF THE INVENTION

The present invention concerns a length measuring system having a scale with a first portion and a second portion separated by a gap, wherein the first and second portions each have incremental graduations. The system further includes a scanner unit for scanning the incremental graduations of the first and second portions, wherein the scanner unit has two groups of scanner elements spaced apart by a distance greater than the width of the gap. The system has at least one control track parallel to and next to the incremental graduations of the first and second portions. A further scanner element is provided to scan the at least one control track and produce an output signal, wherein the output signal is a function of the absolute position of the first and second portions and controls a switchover from one group of scanner elements to the other group of scanner elements. The absolute position of the first and second portions is derived from the control track over the entire measurement length of the scale and the measurement increment of the control track is greater than the measurement increment of the incremental graduations of the first and second portions.

The object of the present invention is to improve a length measuring system of the type described above such that it functions reliably with a low structural height, and that the absolute position is available over the entire measurement length.

This object is attained by a length measuring system, as defined at the outset, by providing that the absolute position is derived from the control track over the entire measurement length of the scale, and as a function of this absolute position a switchover among groups of scanner elements takes place; the measurement increment of this control track is greater than the measurement increment of the incremental graduation.

The advantages of the invention are that the absolute position can be ascertained accurately by the compact length measuring system, and that the switchover positions can be defined exactly. The invention is described in detail hereinafter, in conjunction with the schematic drawings.

DESCRIPTION OF THE PREFERRED EMBODIMENT

Figure 1:
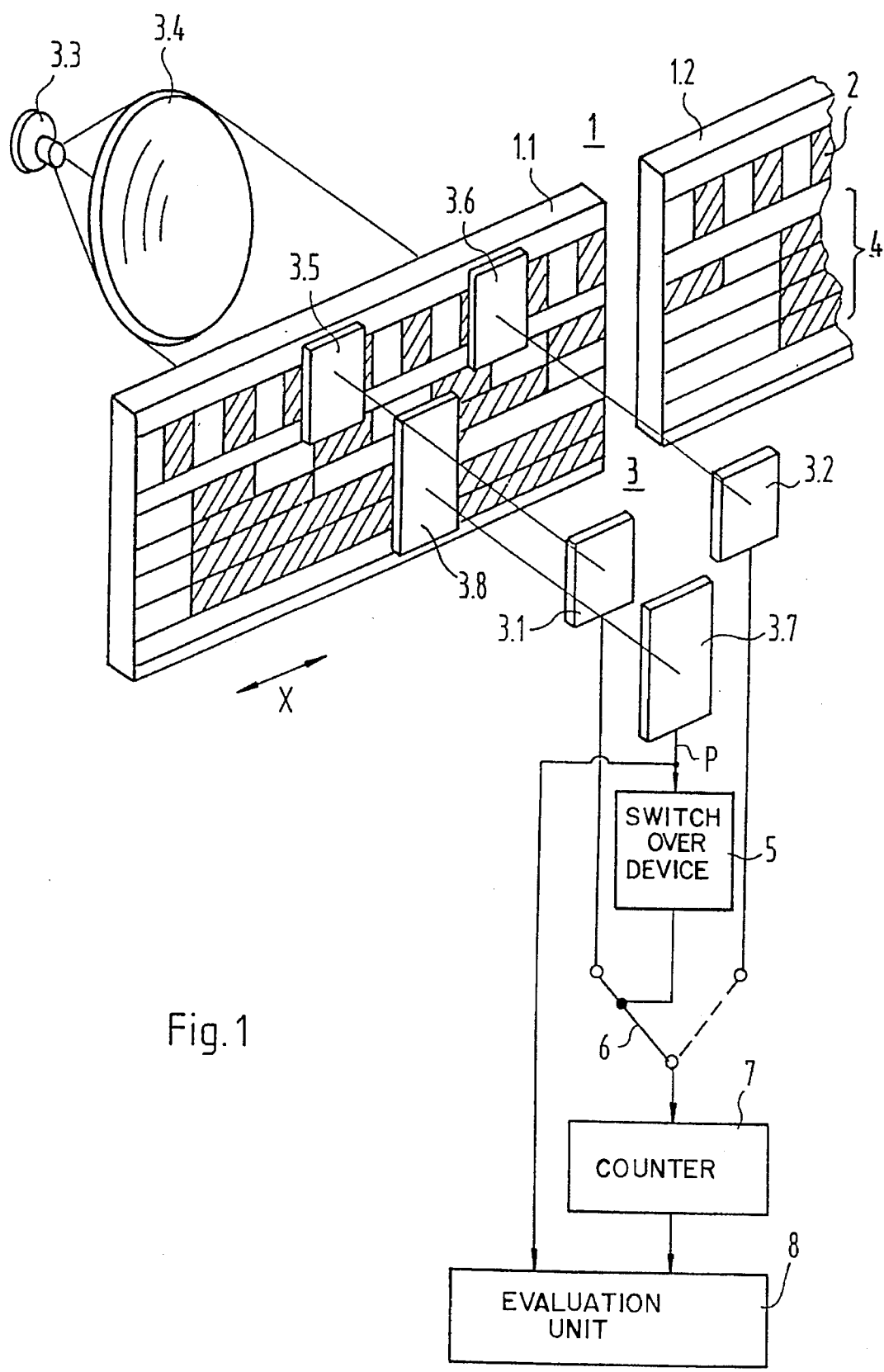
FIG. 1 shows a length measuring system with a scale composed of two portions according to an embodiment of the present invention.

In FIG. 1, the length measuring system comprises a scale 1, which is formed of a plurality of portions 1.1, 1.2 of glass, disposed one after the other in the measurement direction. The portions 1.1, 1.2 are secured in a housing, not shown but known from DE-OS 27 30 715. Scanning of a high-resolution incremental graduation 2 mounted on the portions 1.1, 1.2 is done with a scanner unit 3, of the kind likewise described in detail in DE-OS 27 30 715. The graduation 2 comprises a succession of transparent and nontransparent marks, which are scanned by two groups of scanner elements 3.1, 3.2, spaced apart in the measurement direction X.

Their spacing is greater than the possible gap width between two scale portions 1.1, 1.2.

A parallel beam of light, which is generated by a light source 3.3 and a condenser lens 3.4, falls through the graduation 2 and through four scanning fields of each scanner plate 3.5, 3.6, and from there passes to scanner elements 3.1, 3.2, which are assigned to the various scanning fields. Upon motion of the portions 1.1, 1.2 relative to the scanner unit 3, four sinusoidal phase-displaced scanning signals are produced in each of the two groups of elements 3.1, 3.2.

In addition to the incremental graduation 2, a control track in the form of a code 4 is applied to the portions 1.1, 1.2 and is scanned by a scanning plate 3.8 and a further scanner element 3.7. Advantageously, this code is one-increment code, for instance a gray code. Depending on the output signal P of this scanner element 3.7, which indicates the absolute position, a switchover takes place from one group of scanner elements 3.1, 3.2 of the incremental graduation 2 to the other. According to the invention, the absolute position information P is delivered to a switchover device 5, which depending on the absolute position information P triggers a reversing switch 6, which causes the scanning signals of the incremental graduation 2 to be delivered to a counter 7 in alternation from one group 3.1 and the other group 3.2 of scanner elements. The switchover positions may be stored in a memory of the switchover device 5.

The code 4 defines the absolute positions P over the entire measurement length of all the portions 1.1, 1.2, so that this absolute position P can also be utilized to monitor the counter value in an evaluation unit 8.

It is especially advantageous if the measurement increment of the absolute code 4 is greater than the measurement increment of the incremental graduation 2, and if the gap between two portions 1.1, 1.2 is smaller than the measurement increment of the absolute code 4. Since the admissible gap width is dependent on the solution of the code, the advantage is that a large tolerance for the gap can be chosen and, therefore, in dependence on the code 4, an exact switch-over is guaranteed. Since the accuracy of measurement depends on the incremental division 2, this should have a higher resolution than the gap width.

According to FIG. 1, the code 4 is provided as a control track parallel to and next to the incremental graduation 2. This control track 4 in turn comprises a plurality of single tracks, from which code words can be formed in a known manner. The control track 4 may also have a code in the form of a pseudo-random code—also known as a chain code—as is known for instance from DE-OS 39 09 767.

Figure 2:
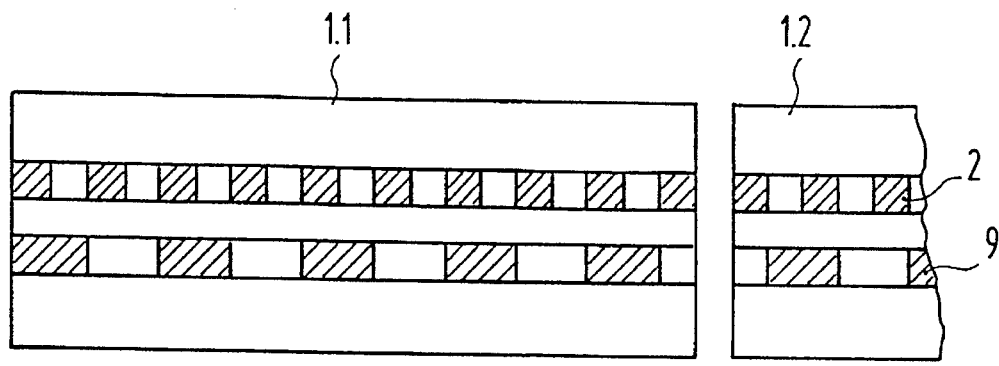
FIG. 2 shows two further portions for the length measuring system of FIG. 1, with one fine incremental graduation and one further, coarser incremental graduation.

The absolute position P over the entire measurement length may, as shown in FIG. 2, also be derived from a coarser incremental graduation 9, having a reference mark, not shown, that is disposed parallel and next to the fine incremental graduation 2. The scanning signals of the coarse graduation 9 and the reference signal are delivered to a counter; the counter state represents the absolute position P over the entire measurement length. The portions 1.1, 1.2 should be mounted such that between them there(is at most a gap of half the resolution (measurement increment, counting increment) of this coarse graduation 9. The fine graduation 2 has an index period of 8 μm, for instance, and the coarse graduation 9 has a period of 2 mm. If four counting increments are derived from each period (by division by four in a known manner), then the gap must amount to no more than 0.25 mm.

In the length measuring systems of FIGS. 1 and 2, if the scanner element 3.7 for the control track 4, 9, on being turned on, is just then in the gap region, or in other words between two portions 1.1, 1.2, then an unequivocal absolute value cannot be ascertained. To avoid a malfunction, it is possible for a further monitor or check track to be provided parallel to the control track 4,9; the nature of this monitor track differs from the nature of the gap over the entire region of the portions 1.1, 1.2. This monitor track may be embodied as opaque, for instance, while the gap is transparent.

In order to avoid having such monitor tracks, one continuous carrier 10 is provided for the control track in the further embodiments; it rests next to the incremental graduation 2 on the portions 1.1, 1.2, 1.3, or is glued to them, or is braced by suspension across an open space, or is glued into a housing 11 or inserted into a groove 12 located in the housing. This separate carrier 10 has a total length that is at least equal to the total measurement length over all portions 1.1, 1.2, 1.3.

Figure 3:
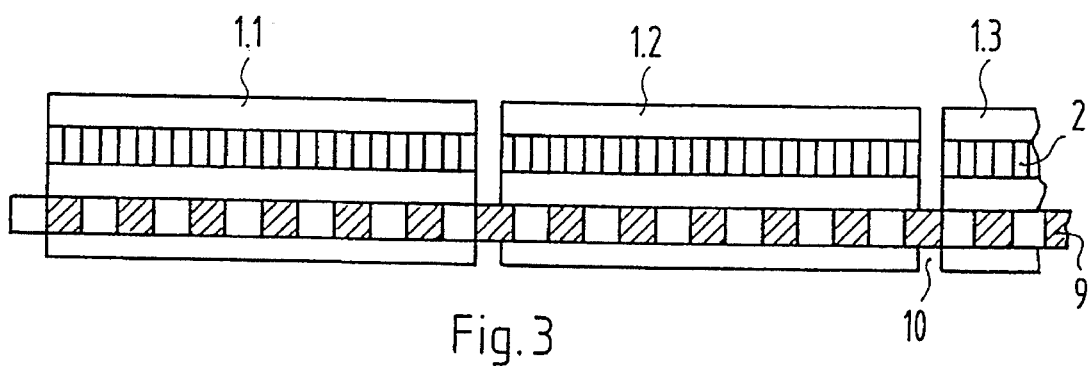
FIG. 3 shows a plurality of portions with a flexible code carrier according to a second embodiment of the present invention.

In FIG. 3, the carrier for the control track is a flexible steel tape 10, which is glued onto the portions 1.1, 1.2, 1.3 next to the incremental graduation 2. The carrier 10 is provided with a coarse incremental graduation 9 that is easy to manufacture, relative to the graduation 2 made up of glass or glass-ceramic portions 1.1, 1.2, 1.3.

Figure 4:
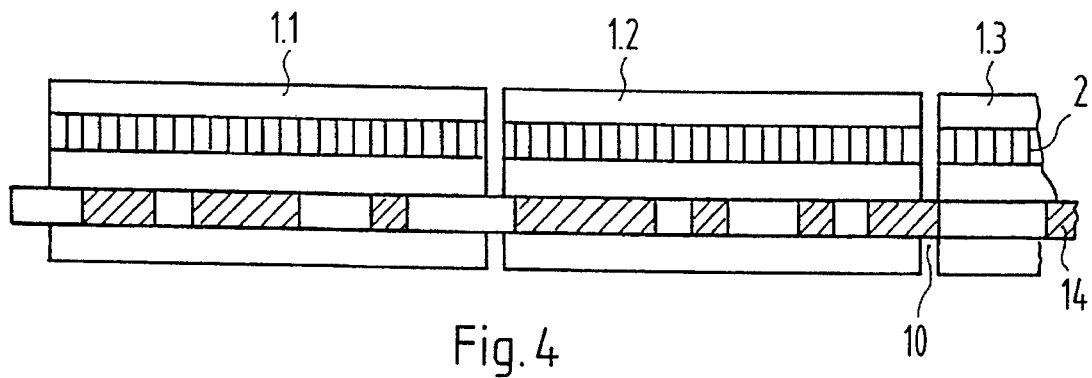
FIG. 4 shows a plurality of portions with a further flexible code carrier according to a third embodiment of the present invention.

It is especially advantageous if a single-track code 14 is mounted on the carrier 10. This version is shown in FIG. 4. The single-track code 14, also known as a pseudo-random code, is scanned by a plurality of scanner elements spaced apart from one another in the measurement direction. From the scanning signals, code words are formed, which differ over the entire measurement length and thus represent the absolute position P. The switchover among groups of scanner elements in the fine incremental graduation 2 takes place as a function of these absolute positions P; see again German Published, Non-Examined Patent Applications 27 30 715, 17 73 460, and 39 28 592.

Figure 5:
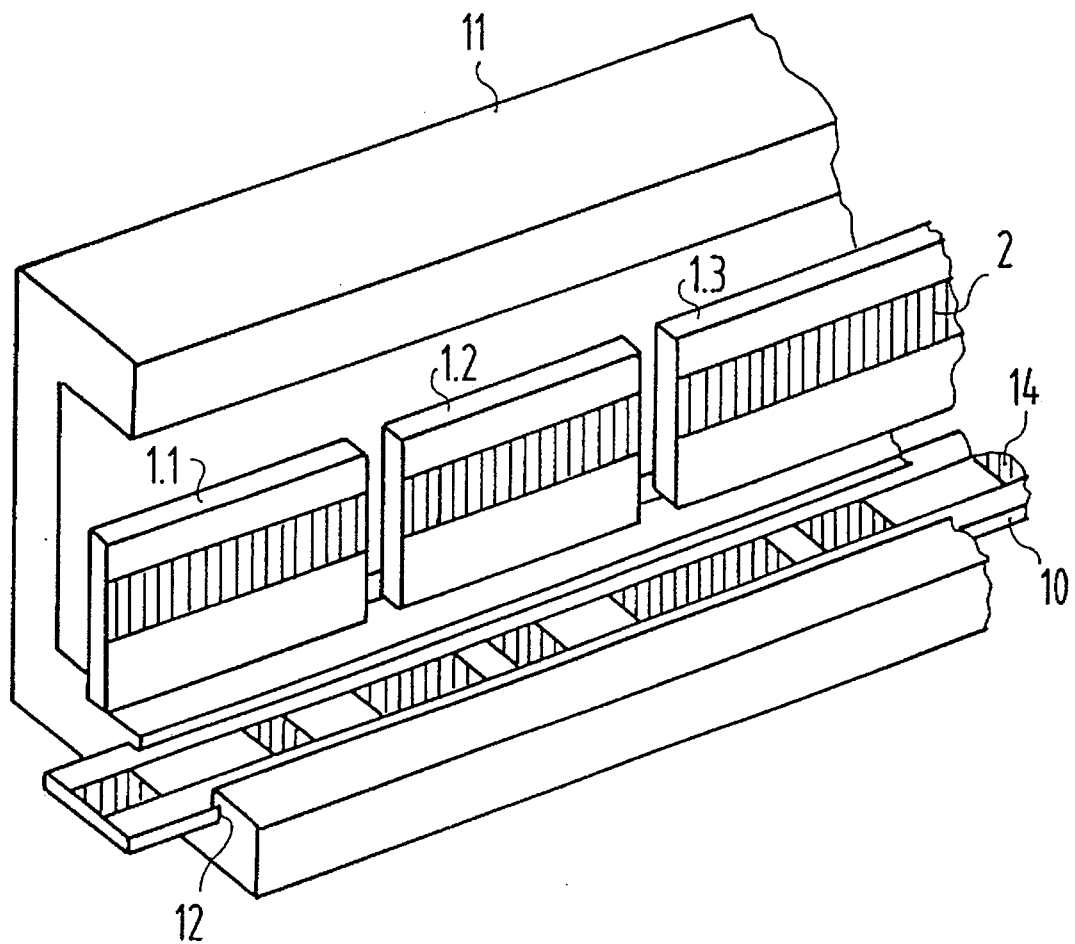
FIG. 5 shows a plurality of portions in a housing according to a fourth embodiment of the present invention.

FIG. 5 shows an encapsulated length measuring system. The portions 1.1, 1.2, 1.3 are secured in the housing 11. The steel tape 10 with the single-track chain code 14 is inserted into a groove 12 of the housing 11. The fine incremental graduation 2 and the code 14 are thus accommodated in protected fashion in the housing 11, and a compact structure is thereby assured.

The code on the continuous carrier may also be a known multi-track code, in a manner not shown.

In all the embodiments, the incremental division 2 may be a component of a plurality of high-resolution code tracks, to which the two reversible groups of scanner elements 3.1 and 3.2 are assigned.

In the embodiments shown, the fine incremental graduation 2 and the control track 4, 9, 14 is scanned photoelectrically; the fine graduation 2 is preferably a phase grating graduation. It is possible for both tracks 2; 4, 9, 14 to be scanned by the transmitted light method or by the incident light method. In the embodiments shown in FIG. 3 and 4, it is advantageous if the fine incremental graduation 2 is scanned by transmitted light, and the control track 14, 9 on the flexible carrier 10 is scanned by incident light. The fine incremental graduation and the control track may also be scanned by different physical principles, for instance the fine graduation photoelectrically and the control track magnetically.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A length measuring system, comprising:

a scale having a first portion and a second portion separated by a gap having a width, said first portion and said second portion each having incremental graduations;

a scanner unit for scanning said incremental graduations of said first and second portions, wherein said scanner unit has two groups of scanner elements spaced apart by a distance greater than said width of said gap;

a control track parallel to and next to said incremental graduations of said first and second portions;

a further scanner element to scan said control track and produce an output signal, wherein said output signal is a function of the absolute position of said scanner unit relative to said first and second portions and controls a switchover from one group of scanner elements to the other group of scanner elements;

wherein the absolute position of said scanner unit relative to said first and second portions is derived from said control track over the entire measurement length of said scale; and wherein a measurement increment of said control track is greater than a measurement increment of said incremental graduations of said first and second portions.

2. The length measuring system of claim 1, wherein said control track comprises a multi-track code that is applied to each of said first and second portions.

3. The length measuring system of claim 1, wherein said control track comprises a single-track chain code that is applied to each of said first and second portions.

4. The length measuring system of claim 1, wherein said control track comprises a coarse incremental graduation that is applied to each of said first and second portions, and said gap between said first and second portions is smaller than a measurement increment of said coarse incremental graduation.

5. The length measuring system of claim 1, wherein said control track is applied to a separate carrier which has a length that is at least equivalent to a total measurement length along both said first and second portions.

6. The length measuring system of claim 5, wherein said carrier comprises a flexible steel tape.

7. The length measuring system of claim 6, wherein each of said first and second portions are made of a material comprising glass and are secured inside a housing; and wherein said steel tape is disposed in a groove of the housing.

8. The length measuring system of claim 5, wherein said control track comprises a multi-track code.

9. The length measuring system of claim 6, wherein said control track comprises a multi-track code.

10. The length measuring system of claim 7, wherein said control track comprises a multi-track code.

11. The length measuring system of claim 5, wherein said control track comprises a single-track chain code.

12. The length measuring system of claim 6, wherein said control track comprises a single-track chain code.

13. The length measuring system of claim 7, wherein said control track comprises a single-track chain code.

14. The length measuring system of claim 5, wherein said control track comprises an incremental graduation.

15. The length measuring system of claim 6, wherein said control track comprises an incremental graduation.

16. The length measuring system of claim 7, wherein said control track comprises an incremental graduation.

* * * * *